United States Patent [19]
Gullotti

[11] Patent Number: 5,353,007
[45] Date of Patent: Oct. 4, 1994

[54] AUTOMOTIVE TURN SIGNAL WARNING DEVICE

[76] Inventor: Paul M. Gullotti, 67B Sullivan Rd., Hudson, N.H. 03051

[21] Appl. No.: 962,244

[22] Filed: Oct. 16, 1992

[51] Int. Cl.$^5$ ............................................. B60Q 1/40
[52] U.S. Cl. .................................. 340/477; 340/468; 340/475; 340/476
[58] Field of Search ................. 340/468, 475, 476, 477

[56] References Cited

U.S. PATENT DOCUMENTS 3,308,428  3/1967  Grontkowski ..................... 340/477
3,964,019  6/1976  Wethe et al. ....................... 340/475
4,302,748  11/1981  Gant .................................. 340/477

*Primary Examiner*—John K. Peng
*Assistant Examiner*—Edward Lefkowitz
*Attorney, Agent, or Firm*—Joseph Funk

[57] ABSTRACT

A turn signal warning device that uses logic circuits to monitor power leads to lights on vehicle that are lit for turn signals, brakes, and emergency blinkers. This device functions on vehicles whereon the same set of lights are used for turn signals and for brakes; and on vehicles on which separate sets of lights are used for turn signals and for brakes. The logic circuits function with a timing circuit and a piezoelectric alarm to provide an audible signal to an operator of the vehicle a predetermined length of time after the turn signals have been activated. The logic circuits sense when the brake pedal has been depressed and the emergency blinkers have been activated to prevent the audible signal from being generated.

3 Claims, 1 Drawing Sheet

AUTOMOTIVE TURN SIGNAL WARNING DEVICE

FIELD OF THE INVENTION

This invention relates to automotive turn signal indicators, and more particularly to a circuit for indicating to the driver of an automobile that their turn signal indicators remain in a state indicating a left or right turn after a predetermined amount of time has passed.

BACKGROUND OF THE INVENTION

The electrical turn signals commonly found on automotive vehicles are designed to be manually operated and to automatically disengage after the steering wheel is straightened out after completing a turn. However, the turn signal too frequently does not automatically disengage after it has been manually engaged. Sometimes the turn signal mechanism becomes faulty and it will manually engage but will not automatically disengage. Most often, however, a turn is too slight to activate the disengagement mechanism to turn off the turn signal. This occurs all the time when using turn signals and changing lanes. The lane change is completed but the turn signals stay on giving a false indication of the drivers intent to turn or to change lanes. Normally, at lower driving speeds a driver would detect that a turn signal remains engaged after a lane change by hearing the clicking of the blinker mechanism, but at highway driving speeds the engine noise and wind noise level inside a car is high enough that the clicking sound cannot be heard.

It is therefore desirable to provide a warning signal that indicates turn signals remain active for more than a predetermined amount of time after they have been engaged.

Prior art turn signal warning devices have problems. Some warning devices can only work in vehicles in which brake lights and turn signal lights are separate. With these devices a driver will often be in a turn lane with their turn signal on and the audible warning signal will engage. This happens because they are in the turn lane more than the timeout period of the warning device. Another problem with these warning devices is that they trigger when emergency flashers are utilized.

Other turn signal warning devices can only work in vehicles in which the same light bulbs are used as brake lights and turn signal lights. A problem with these warning devices is that they also trigger when emergency flashers are utilized.

Thus, there is a need in the art for a single turn signal warning device that can work both in vehicles in which turn signal lights are separate from brake lights, and in vehicles in which the same light bulbs are used for both turn signals and brake signals.

In addition, there is a need in the art for a turn signal warning device that will not be engaged when emergency blinkers are utilized, or when a brake pedal is depressed for a period of time, or when a turn signal is deliberately engaged for a longer than normal period of time because the vehicle is in a turn lane waiting to turn.

SUMMARY OF THE INVENTION

The present invention is a turn signal warning device that works in vehicles that have separate turn signal lights and brake lights, and also works in vehicles that have one set of lights that are used for both turn signals and brakes and meets unfilled needs in the prior art. This operation is possible with no modification to the turn signal warning device. The present turn signal warning device will not provide an unwanted warning signal when the emergency blinker signals are being used. Further, the present turn signal warning device will not provide an unwanted warning signal when a turn signal is deliberately engaged for a longer than normal period of time because the vehicle is in a turn lane waiting to turn. In addition, the present invention will not provide an unwanted warning signal when the brake pedal is depressed for a period of time.

To provide these operations logic circuits are utilized to sense lamp lighting combinations that are valid, whether in a vehicle with separate turn signal lights and brake lights or in a vehicle with one set of lights for turn signals and brakes. The logic circuits generate a signal indicating when only turn signal lights are engaged to start a timer circuit that times a pre-determined period and turns on an audible alarm if the turn signals remain operated after that period of time.

DESCRIPTION OF THE DRAWING

The invention will be better understood when reading the following detailed specification in conjunction with the drawing in which.

DETAILED DESCRIPTION

Figure 1:
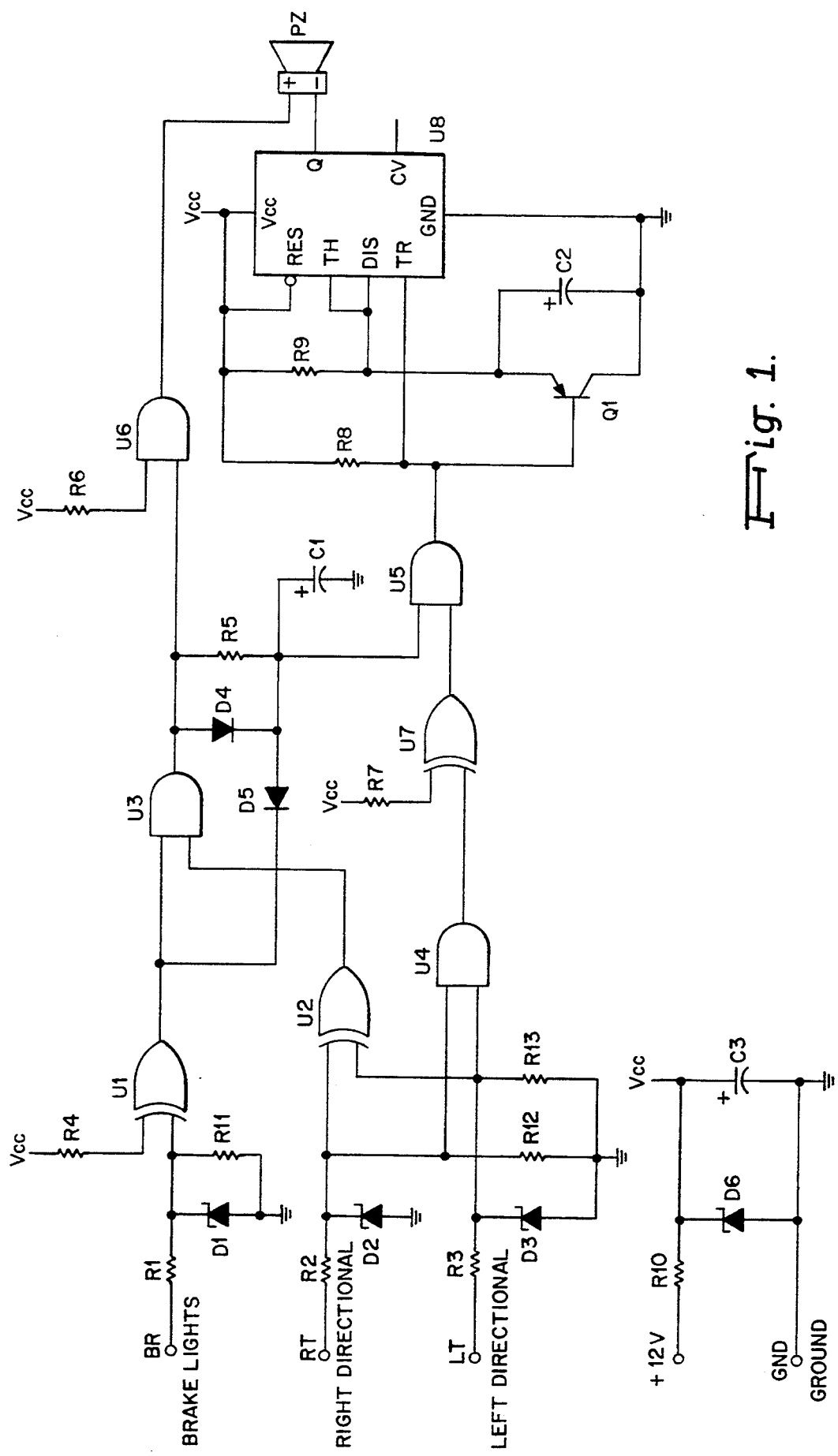
FIG. 1 is a schematic diagram of my novel turn signal warning device.

A schematic diagram of my novel automotive turn signal warning device is shown in FIG. 1. There are five leads used to connect my novel device to an automobile. Those leads are BR, RT, LT, 12V and GND on the drawing. The device is mounted under the automobile dashboard as not to obstruct the audible alarm of the device and the leads are then connected as follows.

The power leads are connected in a conventional manner. Lead 12V is connected to the accessory side of the automobile electrical system along with the vehicle radio, windshield wipers, etc. This will result in no power being applied to my novel device when the automobile is not in use. An empty fuse position on the fuse block of an automobile is located, a one amp fuse installed therein, and lead 12V is connected to this fuse. Alternatively, an existing fuse serving accessory circuits, one or more of which are not supplied on the automobile, may be used. Lead 12V may be connected to this fuse or to any accessory power lead going to this fuse.

Ground lead GND is connected to any ground with return to the vehicles negative terminal on the battery.

As mentioned previously, my novel turn signal warning device may be connected both to cars that have separate brake lights and turn signal lights, and to cars that have one set of lights for both brake and turn signals. This may be done with no modifications to the turn signal warning device.

When connecting my novel signal device to a car having separate brake lights and turn signal lights, all five leads are all connected. Lead BR is connected to the power lead going to the brake lights on the vehicle. Lead RT is connected to the power/signal lead going to the right turn signal light, and lead LT is connected to the power/signal lead going to the left turn signal light.

When connecting my novel signal device to a car having one set of lights for both brakes and turn signals, the BR lead is not utilized. Only leads RT and LT are connected as described in the last paragraph.

The design of my novel turn signal warning device is built around an LM555 timer circuit U8 that may be obtained from National Semiconductor Company. In my design this timer U8 is driven by logic circuitry that recognizes and indicates when a turn signal has been activated, the foot brake pedal has been depressed, and when emergency flashers have been operated.

Power is supplied to my novel warning device via leads 12V and GND when the vehicle's ignition is turned on. Resistor R10, zener diode D6 and capacitor C3 provide voltage regulation to the device thereby accommodating voltage fluctuations always found in motor vehicles. The regulated voltage Vcc is provided to the circuits in my device as shown in FIG. 1.

In vehicles that utilize one set of lights for both turn signals and brakes, when either the right or left turn signal is engaged, there is a pulsed signal on the corresponding lead RT or LT. When the brake pedal is depressed there is power applied concurrently on leads RT and LT. When the emergency blinkers are engaged there is a pulsed signal applied concurrently on leads RT and LT. As mentioned previously, lead BR is not utilized.

In vehicles that utilize separate brake lights and turn signal lights, when either the right or left turn signal is engaged, there is a pulsed signal on the corresponding lead RT or LT. When the brake pedal is depressed there is power applied to lead BR. When the emergency blinkers are engaged there is a pulsed signal applied to both leads RT and LT.

The turn signal on lead RT is clipped by zener diode D2 connected to lead RT to protect the logic circuits in my novel device from high voltages and transients normally existing in automotive electrical systems. The turn signal on lead LT is clipped by zener diode D3 connected to lead RT to also protect the logic circuits in my novel device. Resistors R2 and R3 provide current limiting. Resistor R1 and diode D1 connected to lead BR provide the same functions.

Leads RT and LT are connected via current limiting resistors to the two inputs of exclusive OR gate (XOR) U2 and to the two inputs of AND gate U4. XOR gate U2 is part of a single 4030 logic circuit along with XOR gates U1 and U7. AND gate U4 is part of a single 4081 logic circuit along with AND gates U3, U5 and U6.

The two inputs of XOR gate U2 and of AND gate U4 are normally low. When there is a turn signal pulse applied to either lead RT or lead LT the output of XOR gate U2 goes from its normally low state to a high state. If there is a high signal on both leads RT and LT, as there will be for brakes or emergency signals in vehicles that utilize one set of lights for brake and turn signals, the output of XOR gate U2 will remain low.

XOR gate U1 connected to lead BR is operated as an inverter. The output of this gate is normally high and goes low only when there is a brake signal present on lead BR. The output of XOR gate U1 is connected to one of the two inputs of AND gate U3 and keeps this input normally high. When there is a turn signal on either lead RT or LT, the output of XOR gate U2 goes high each time there is a turn signal pulse. The output of XOR gate U2 is connected to the second input of AND gate U3 so each time there is a turn signal pulse the output of this AND gate goes high. However, if the brake pedal is depressed while the turn signals are operating in a vehicle having separate brake and turn signal lights the input to AND gate U3 from XOR gate U1 goes low and the output of the AND gate remains low while the brake pedal is operated.

Connected to the output of AND gate U3 are several components including capacitor C1 which has a value of 4.7 uF. When there is no turn signal, capacitor C1 remains discharged. When there is a turn signal and the output of AND gate U3 goes high, capacitor C1 charges very rapidly through diode D4, a 1N4001 diode. If the brake pedal is depressed the output of AND gate U3 goes low and capacitor C1 discharges very rapidly through diode D5, a 1N4001 diode.

Thus, when the turn signal is activated, and the brake pedal is not depressed, capacitor C1 is charged. The positive terminal of capacitor C1 is connected to one of the two inputs of AND gate U5. The second input of AND gate U5 is connected to the output of XOR (exclusive OR) gate U7 which is operated as an inverter. The output of XOR gate U7 is normally high, so as capacitor C1 charges, both inputs of AND gate U5 are high and its output also goes high.

Connected to the output of AND gate U5 is a PNP transistor Q1 (2N3906) that is normally conducting and thereby placing a short across 47 uF capacitor C2. Due to this short, capacitor C2 is prevented from charging. When there is a turn signal the output of AND gate U5 goes high and transistor Q1 stops conducting. Capacitor C2 commences charging through 380 kilohm resistor R9. After approximately seventeen seconds capacitor C2 charges to a level that turns circuit U8 on to activate an audible alarm. Circuit U8 is a National Semiconductor LM555.

In applications where a common set of lights are used for both brake and turn signals, both leads LT and RT have power applied to them when either brakes or emergency flashers are utilized. Thus, both of the inputs to AND gate U4 are high and its output goes high. XOR (exclusive OR) gate U7 is operating as an inverter so the output of this XOR gate goes from its normally high state to a low state. Since the output of XOR gate U7 is connected to one of the two inputs of AND gate U5, both inputs of AND gate U5 cannot go high. This prevents the charging of capacitor C2 to start timing for the generation of the audible alarm.

In a vehicle in which a common set of lights are used for brakes and turn signals, both leads RT and LT will be high when the left and right bulbs are both lit. They will both be lit steadily if the brakes are operated, and they will both be lit intermittently if the emergency signals are energized. Thus, both inputs to XOR gate U2 remain at the same level and the output level of this gate circuit does not change. The time out cycle never starts with the charging of capacitor C2 to trigger circuit U8, so an audible signal is never generated no matter how long the brake lights are lit and no matter how long the emergency signals are engaged.

Circuit U8 has an output Q that is normally high and goes low approximately seventeen seconds after the turn signals have been engaged, and the brake pedal is not depressed. This output of circuit U8 is connected to the negative terminal of piezoelectric alarm PZ. The positive terminal is connected to the output of AND gate U6. One input of AND gate U6 is connected to voltage Vcc through resistor R8 as shown, and the second input to AND gate U6 is connected to the output of AND gate U3 and is pulsing when the turn signal is activated. The only purpose of AND gate U6 is to synchronize the turn signal with the audible signal output from alarm PZ. Each time there is a turn signal pulse the output of AND gate U6 goes high and permits current to flow through alarm PZ.

While what has been described above is the preferred embodiment of the invention, one skilled in the art may make many changes without departing from the teaching of the invention. For example, XOR gates U1, U2 and U7 that all operate as inverters may be replaced by inverting amplifiers, or the AND gates to which they connect may have inverting inputs.

What is claimed is:

1. A turn signal warning device that can operate in a vehicle that has only a first set of lights that are energized for turn signals, brake lights and emergency blinkers; and in a vehicle that utilizes said first set of lights only for turn signals and emergency blinkers, and utilizes a second set of lights only for brakes, said turn signal warning device comprising:
   a first circuit sensing power applied to set first set of lights when said turn signals have been activated, said first circuit providing a first signal indicating that said turn signals have been activated;
   a second circuit sensing the power applied to said first set of lights, said second circuit providing a second signal only when said first set of lights are energized indicating that said brake pedal has been depressed and when said emergency blinkers have been activated in a vehicle that utilizes said first set of lights for turn signals, brake lights and emergency blinkers;
   a third circuit sensing the power applied to said second set of lights, said third circuit providing a third signal only when said second set of lights are energized indicating that said brake pedal has been depressed in a vehicle that utilizes said second set of lights for brake lights;
   a timing circuit that is energized responsive to said first signal to time a predetermined period; either said second signal or said third signal preventing said timing circuit from being responsive to said first signal to time said predetermined period; and
   an alarm responsive to said timing circuit having timed said predetermined period to provide a fourth signal to an operator of said vehicle that the turn signals are activated.

2. The invention in accordance with claim 1 further comprising a control circuit responsive to said first signal for pulsing said alarm in synchronization with the operation of said turn signals.

3. The invention in accordance with claim 2 further comprising a fourth circuit that is responsive to either said second signal or said third signal to prevent said timing circuit from timing said predetermined period only when said brake pedal has been depressed or said emergency blinkers have been activated.

* * * * *